United States Patent [19]

Feuer

[11] 4,005,409
[45] Jan. 25, 1977

[54] MULTIPLE MODE INPUT ANALOG CONTROLLER HAVING STANDBY POWER SUPPLY AND ABSENCE-OF-INPUT SENSING

[75] Inventor: Mervyn L. Feuer, Los Angeles, Calif.

[73] Assignee: Robertshaw Controls Company, Richmond, Va.

[22] Filed: Mar. 10, 1975

[21] Appl. No.: 556,999

[52] U.S. Cl. .................. 340/347 C; 340/347 AD; 340/347 DA; 307/66; 235/92 T
[51] Int. Cl.$^2$ ...................... H03K 13/02
[58] Field of Search ............ 340/347 DA, 347 AD, 340/347 C, 147 C, 147 MT; 324/99 D; 235/92 MP, 151.1, 151.11, 92 T; 307/64, 66

[56] References Cited

UNITED STATES PATENTS

| 3,059,223 | 10/1962 | Bell | 340/347 AD |
|---|---|---|---|
| 3,249,769 | 5/1966 | Mierendorf | 307/317 X |
| 3,496,562 | 2/1970 | Smith | 340/347 DA |
| 3,510,603 | 5/1970 | Gaerttner et al. | 340/347 AD |
| 3,513,468 | 5/1967 | Fluegel | 340/347 DA |
| 3,548,169 | 12/1970 | Togneri | 235/92 MP |
| 3,603,979 | 9/1971 | Kosakowski | 340/347 AD |
| 3,634,854 | 1/1972 | Anderson | 340/347 AD |
| 3,714,645 | 1/1973 | Sivertson | 235/92 T X |
| 3,721,887 | 3/1973 | Nickerson | 307/66 X |
| 3,757,131 | 9/1973 | Krutz et al. | 307/66 X |
| 3,811,050 | 5/1974 | Michelet et al. | 307/64 |
| 3,852,575 | 12/1974 | Daniels et al. | 235/92 T |
| 3,859,638 | 1/1975 | Hume | 340/173 CP |
| 3,880,516 | 4/1975 | Post et al. | 235/92 T X |
| 3,900,844 | 8/1975 | Wald | 340/347 C |

OTHER PUBLICATIONS

Analog Devices, Inc., Analog–Digital Conversion Handbook, 6/72, p. I–84, 85.

Primary Examiner—Thomas J. Sloyan
Attorney, Agent, or Firm—O'Brien & Marks

[57] ABSTRACT

A controller produces an analog output signal which can be changed in accordance with digital input instruction signals, such as pulse coded binary signals or duration coded binary signals. A memory circuit is isolated and connected to a standby battery in the event that a main power circuit fails.

5 Claims, 9 Drawing Figures

MULTIPLE MODE INPUT ANALOG CONTROLLER HAVING STANDBY POWER SUPPLY AND ABSENCE-OF-INPUT SENSING

BACKGROUND OF THE INVENTION

1. Field of the Invention

The invention relates to control circuits for producing analog output control voltages which may be varied in accordance with digital input signals to control a process, device, etc.

2. Description of the Prior Art

The prior art, as exemplified in U.S. Pat. Nos. 3,059,223, No. 3,247,507, No. 3,249,769, No. 3,317,828, No. 3,496,562, No. 3,505,531, No. 3,513,468, No. 3,548,169, No. 3,579,146, and No. 3,757,131, contains a number of circuits including process controlling digital-to-analog circuits, and standby power circuits for memories or counters. Prior art devices and systems for generating analog control signals in accordance with digital input signals, such as from a computer, often used mechanical devices such as stepping motors pulsed incrementally to control an analog output voltage; such controlling device requiring separate circuitry to respond to analog input control voltage or types of input signals. Additionally, prior art circuits generally had many deficiencies such as being excessively expensive, unreliable or being incapable of being readily adapted to respond to a number of input signals such as pulse incremental signals, pulse duration signals, or analog input signals.

SUMMARY OF THE INVENTION

The invention is summarized in that a controller circuit includes a memory having an input and a plurality of outputs for generating digital signals; digital-to-analog converting means responsive to the digital signals from the memory for converting the digital signals to an analog signal; input means connected to the input of the memory and responsive to digital input signals for changing the digital signals in the memory; main power supply means for the memory, the digital-to-analog converting means, and the input means; standby power means; means responsive to failure of the main power means and energized by the standby power means for maintaining power to the memory means; and means operated by the power maintaining means for blocking current flow from the plurality of outputs of the memory.

An object of the invention is to construct a controller circuit for generating an analog output control signal in accordance with a plurality of different input signals such as pulse increment signals, pulse duration signals, and analog signals.

Another object of the invention is to provide a controller circuit wherein the memory is maintained volatile in the event of power failure.

It is also an object of the invention to provide a controller circuit which can be transferred from computer to local control and then back to computer control without any change in output of the controller circuit.

An advantage of the invention is that a controller circuit is contained within a single module which utilizes only a small amount of power.

Other objects, advantages, and features of the invention will become apparent from the following description taken in conjunction with the accompanying drawings.

DESCRIPTION OF THE PREFERRED EMBODIMENT

Figure 1:
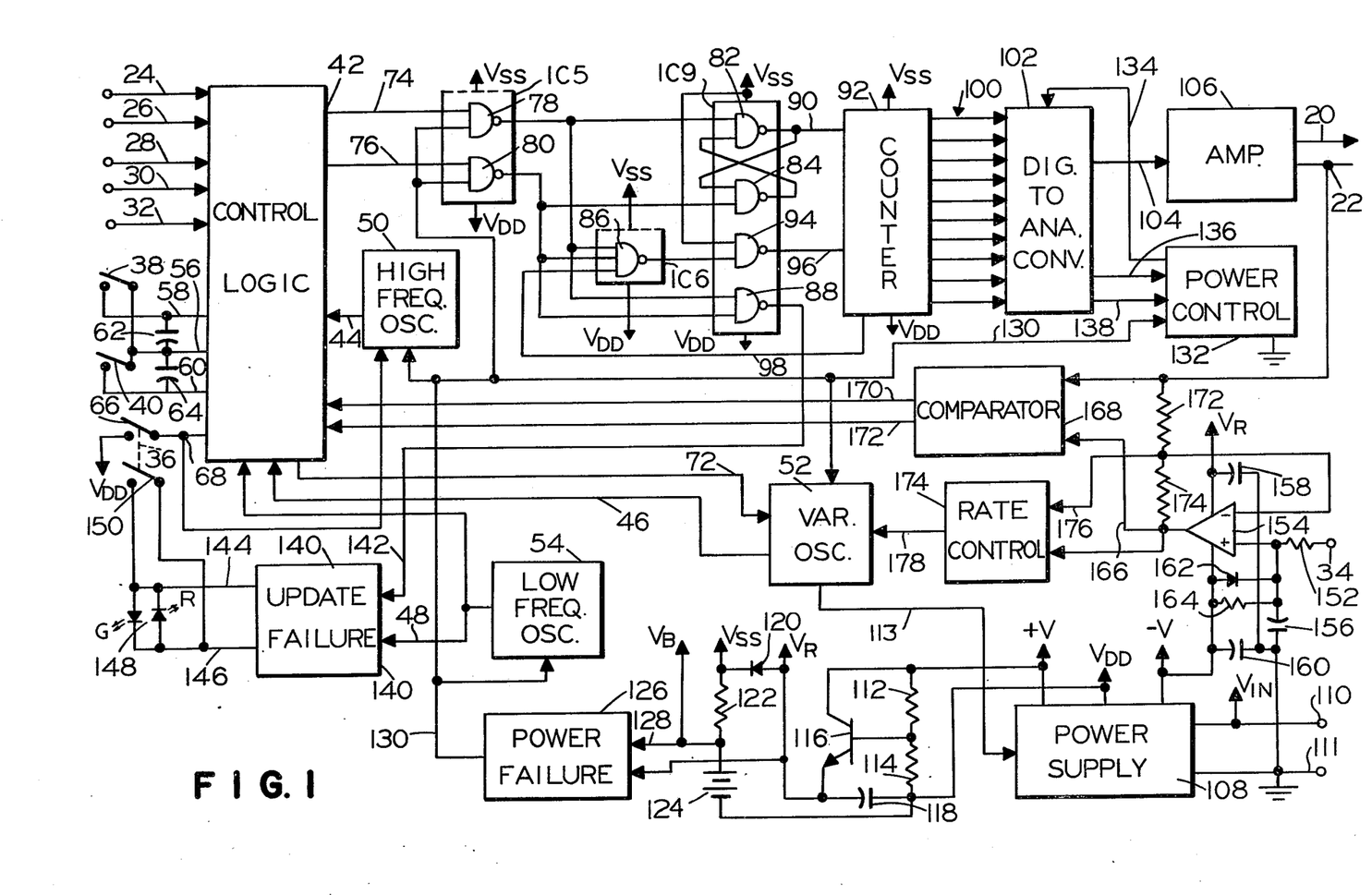
FIG. 1 is a diagram of a controller circuit in accordance with the invention.

As illustrated in FIG. 1, the invention is embodied in a controller for producing analog output or control signals on lines 20 and 22 which can be increased or decreased in accordance with instruction signals on one or more input lines 24, 26, 28, 30, 32 and 34. Also the controller has manual or local control switches 36, 38 and 40 for providing alternate manual control instead of automatic control by signals on the lines 24, 26, 28, 30, 32 or 34.

The input lines 24, 26, 28, 30 and 32 are controlled by digital or binary signals from a remote device such as a computer (not shown) while the input line 34 is controlled by an analog control voltage from a suitable device such as a variable voltage source (not shown). The input lines 24 and 26 are increase signal lines, the lines 28 and 30 are decrease signal lines, and the line 32 is a control line for automatically switching control of the circuitry from the lines 24, 26, 28 and 30 to the line 34 or vice versa. The switch 36 is a manual switch for selectively conditioning the controller for automatic operation by input signals on lines 24, 26, 28, 30, 32 and 34 or for manual operation by switches 38 and 40 which are respectively increase and decrease signal switches.

The controller circuit employs NAND gates which refer to a binary logic gate circuit having an output which is high when any input is low, and which output is low only when all inputs to the logic gate circuit are high. Voltages approximating the voltages on voltage terminals $V_{SS}$ and $V_{DD}$ correspond to the respective "high" and "low" binary signals.

The input lines 24, 26, 28, 30 and 32 are connected to a control logic circuit 42 together with input lines 44, 46 and 48 from a high frequency oscillator circuit 50, a variable oscillator circuit 52 and a low frequency oscillator 54, respectively. A line 56 connects one side of each of the switches 38 and 40 to the control circuit while the other side of the respective switches 38 and 40 are connected by respective lines 58 and 60 to the control circuit 42. Filter capacitors 62 and 64 are connected from the respective lines 58 and 60 across to the line 56. Contacts 66 of the switch 36 are connected between the voltage terminal $V_{DD}$ and the line 68 to another input of the control circuit 42. Control output line 72 is connected from the control circuit 42 to an input of the variable oscillator 52. Signal output lines 74 and 76 are connected to first inputs of respective NAND gates 78 and 80 which have their outputs connected to first inputs of respective NAND gates 82 and 84 having outputs and second inputs interconnected to form a bistable multivibrator circuit. Also the outputs of gates 78 and 80 are connected to respective first and second inputs of a three-input NAND gate 86, and to the respective inputs of a two-input NAND gate 88. The output of gate 82 is connected to an up/down input line 90 of a memory or binary counter circuit 92. The output of gate 86 is connected to a first input of a NAND gate 94 which has its second input connected to the high voltage terminal $V_{SS}$. The output of the gate 94 is connected to a clock input line 96 of the counter circuit 92. A full or empty signal line 98 from the counter 92 is connected to the third input of the gate 86.

A plurality of digital output lines, such as binary output lines indicated generally at 100, are connected from the outputs of the counter 92 to respective inputs of a digital-to-analog converter 102. An analog output line 104 from the digital-to-analog converter 102 is connected to the input of an amplifier circuit 106 which drives the analog output lines 20 and 22.

A power supply 108 for the controller has inputs from input terminals 110 and 111 connected across a suitable DC voltage source (not shown) wherein the input 110 supplies a voltage terminal $V_{IN}$ and the input 111 is ground. Another input of the power supply 108 is connected to a line 113 from the variable oscillator 52. The power supply 108 has a negative voltage output terminal −V, a high voltage output terminal +V, and the voltage terminal $V_{DD}$ which produces a voltage intermediate the voltage on terminal +V and the ground. A filter circuit includes resistances 112 and 114 connected across the terminals +V and $V_{DD}$ as a voltage divider together with an NPN transistor 116 and a filter capacitance 118. The collector of the transistor 116 is connected to the terminal +V, and the emitter of the transistor is connected to one side of the capacitance 118 which has its other side connected to the terminal $V_{DD}$. The base of the transistor 116 is connected to the junction between the resistances 112 and 114. The junction of the capacitance 118 and the emitter of the transistor 116 is connected to a voltage terminal $V_R$ and by a diode 120 to the voltage terminal $V_{SS}$ which is connected by a charging resistance 122 to the positive electrode of a rechargeable battery 124 having its negative electrode connected to the terminal $V_{DD}$. The positive voltage electrode of the battery 124 is connected to a voltage terminal $V_B$. The battery 124 is such that it produces an output voltage which is less than the difference between the voltage on terminal $V_R$ and the voltage on terminal $V_{DD}$ but sufficient to operate integrated circuits of complementary metal-oxide-silicon structure.

A power failure sensing circuit 126 has inputs from the voltage terminal $V_R$ and from the positive electrode of the battery 124. The output of the power failure sensing circuit 126 on line 130 is connected to control inputs of the high frequency oscillator 50, variable oscillator 52, low frequency oscillator 54, NAND gates 78 and 80, and a power control circuit 132. Lines 134 and 138 from the power control circuit 132 are connected to the respective positive and negative power supply terminals of the digital-to-analog converter. A line 136 from the digital-to-analog converter 102 to the power control 132 is a current amplification control lead.

An update failure sensing circuit 140 has inputs from the low frequency oscillator on line 48 and a reset input connected to line 142 from the output of NAND gate 88. Output lines 144 and 146 from the update failure sensing circuit 140 are connected to opposite terminals of a solid state light emitting device 148 which emits red light when energized in one polarity and green light when energized in the opposite polarity. Contacts 150 of the switch 36 are connected across the terminals of the light emitting device 148.

The analog input 34 is connected by a resistance 152 to the non-inverting input of an operational integrated circuit amplifier 154. A protective circuit connected to the non-inverting input of the amplifier 154 includes a filter capacitor 156 connected to ground, a capacitor 158 connected to the positive voltage supply for the amplifier 154 on terminal $V_R$, and a parallel combination of a capacitance 160, clamping diode 162, and input resistance 164 connected to the negative voltage supply input of the amplifier 154 on terminal −V. The output of the amplifier 154 is connected by line 166 to one input of a comparator circuit 168 which has its other input connected to line 22 from the buffered output of the amplifier 106. Outputs of the comparator circuit 168 on lines 170 and 172 are connected to respective inputs of the control logic circuit 42. A rate control circuit 174 has inputs connected to the line 166 and to a line 176 connected to the junction between resistances 172 and 174 connected in series across the line 22 and line 166. The output of the rate control circuit 174 on line 178 is connected to a control input of the variable oscillator 52.

Figure 2:
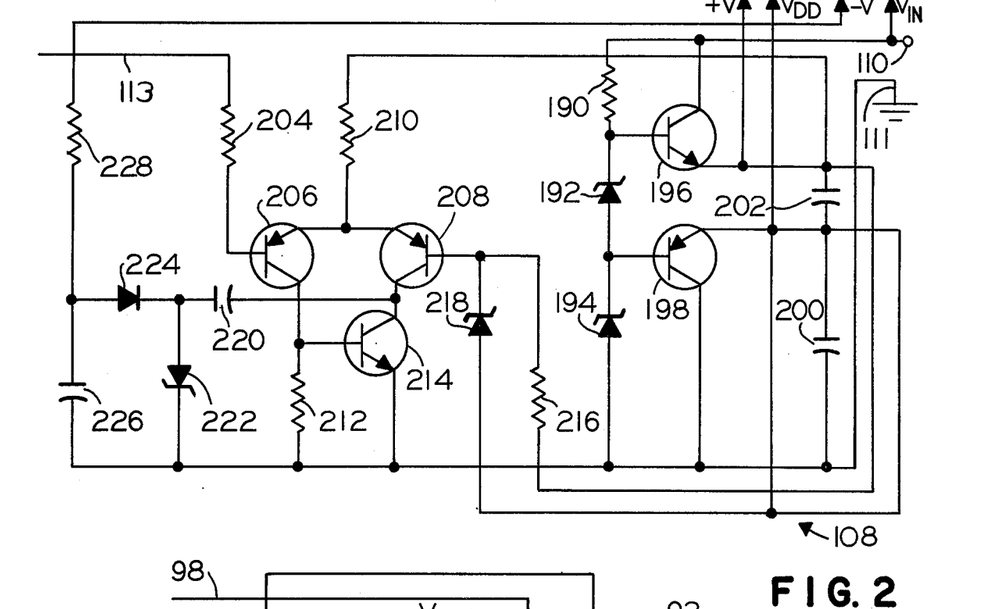
FIG. 2 is a detailed diagram of a power supply circuit of the circuit in FIG. 1.

In the power supply circuit 108, as shown in FIG. 2, the input terminals 110 and 111 are connected across a series circuit including a resistor 190 connected at one end to the positive input voltage terminal 110, a voltage regulating or zener diode 192 having its cathode connected to the other end of the resistor 190, and a voltage regulating or zener diode 194 having its cathode connected to the anode of the diode 192 and having its anode connected to the ground terminal 111. An NPN transistor 196 has its collector connected to the positive input terminal 110 and its base connected to the junction of the resistor 190 with the cathode of the diode 192. A PNP transistor 198 has its base connected to the junction between the diodes 192 and 194 and the collector of the transistor 198 is connected to the ground input terminal 111. The emitter of the transistor 198 is connected to one side of a capacitance 200 which has its other side connected to the ground input terminal 111 while the emitter of the transistor 196 is connected to one side of the capacitor 202 which has its other side connected to the emitter of the transistor 198. The emitter of the transistor 196 is joined to the voltage terminal +V while the emitter of the transistor 198 is joined to the voltage terminal $V_{DD}$. The zener diodes 192 and 194 are selected to produce the suitably selected voltages on the terminals +V and V.

The line 113 from the variable oscillator 52 is connected by a resistance 204 to the base of a PNP transistor 206 which has its emitter connected together with the emitter of a PNP transistor 208 to one end of a resistance 210 having its other end joined to the voltage terminal +V. The collector of the transistor 206 is connected to one end of a resistance 212 which has its other end connected to the ground terminal 111. A NPN transistor 214 has its base connected to the collector of the transistor 206, its collector connected to the collector of the transistor 208, and its emitter connected to the ground terminal 110. The base of the transistor 208 is connected to the junction between one end of a resistance 216, joined at its other end to the voltage terminal +V, and the cathode of a zener diode 218 which has its anode connected to the voltage terminal $V_{DD}$. An AC coupling capacitance 220 couples the collectors of transistors 208 and 214 to the anode of a zener diode 222 which has its cathode connected to the ground 111. A series rectifying diode 224 and filter capacitance 226 are connected across the zener diode 222 with the cathode of the diode 224 connected to the anode of the diode 222. The junction between the anode of the diode 224 and the capacitance 226 is joined by a resistance 228 to the voltage terminal −V.

Figure 3:
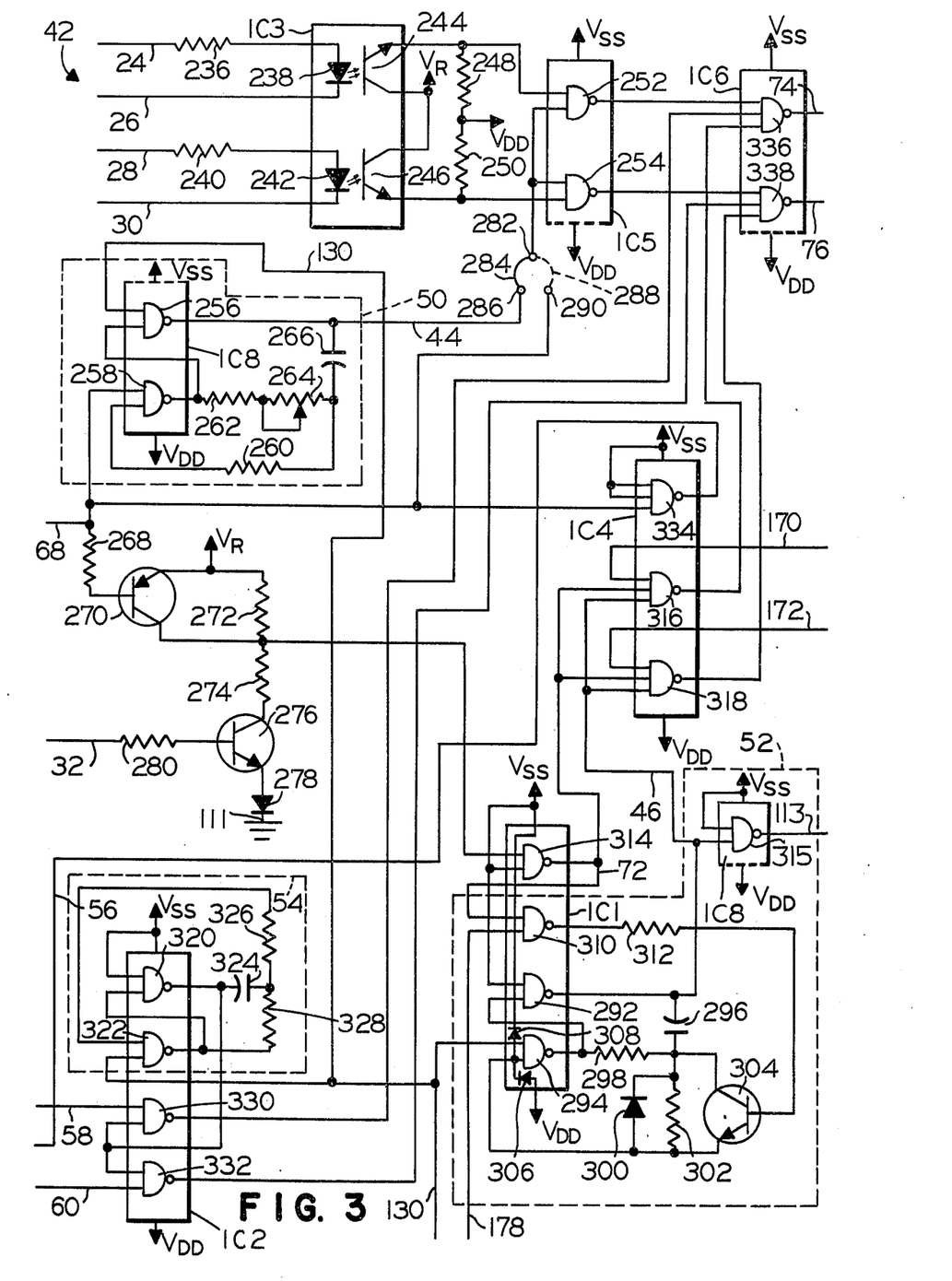
FIG. 3 is a detailed diagram of a control logic circuit in the controller circuit of FIG. 1.

In the control logic circuit 42, as shown in FIG. 3, the up input lines 24 and 26 are connected by a protective resistance 236 across a light emitting diode 238 in an optical isolator IC3, while the down input lines 28 and 30 are connected in series by a protective resistance 240 across a light emitting diode 242 in the optical isolator IC3. Photosensitive semiconductor devices or phototransistors 244 and 246 are connected in series with respective load resistances 248 and 250 across the voltage terminals $V_R$ and $V_{DD}$. The optical isolator IC3 is a commercial optical isolator containing the photosensitive semiconductor devices 244 and 246 in proximity to the respective light emitting diodes 238 and 242 to be operated by light generated thereby. The outputs of the optical isolator IC3 are applied to first inputs of respective dual input NAND gates 252 and 254.

The high frequency oscillator 50 includes a dual input NAND gate 256 having a first input connected to the output of a dual input NAND gate 258 which has its first input connected by a resistance 260 to one end of a pair of series resistances 262 and 264 connected to the output of the gate 258. A capacitor 266 has one side connected to the junction of resistance 260 with the resistance 264, and the other side of the capacitor 266 is connected to the output of the gate 256. The resistance 264 is a variable resistance allowing adjustment of the frequency of the oscillator circuit 50. The second input of the NAND gate 258 is connected to the line 68 from the contacts 66 of the switch 36.

The input line 68 is also connected by a resistance 268 to the base of a PNP transistor 270 which has its emitter connected to the voltage terminal $V_R$ and its collector connected to a junction between resistances 272 and 274 which are connected in series with the collector-emitter of an NPN transistor 276 and a diode 278 between the voltage terminal $V_R$ and the ground terminal 111. The base of the transistor 276 is connected by a resistance 280 to the input control line 32.

The second inputs of the NAND gates 252 and 254 are connected to a terminal 282 which may be selectively connected by a strap or jumper 284 to a terminal 286 joined to the line 44 from the output of the oscillator 50 or NAND gate 256 to select a pulse duration or pulse width mode of operation by input lines 24, 26, 28, and 30. Alternately, the jumper 284 is removed and a jumper 288 (shown in phantom) is connected between the terminal 282 and a terminal 290 joined to the line 68 to select a pulse increment or step mode of operation by input lines 24, 26, 28 and 30.

The variable oscillator 52 includes a dual input NAND gate 292 which has a first input connected to the output of a dual input NAND gate 294 with the outputs of the gates 292 and 294 connected by a series connection of a capacitance 296 and a resistance 298, the resistance 298 being connected to the output of the gate 294. A parallel combination of a diode 300, resistance 302, and collector-emitter of an NPN transistor 304 are connected from the junction of the resistance 298 and the capacitance 296 to a first input of the gate 294; the emitter of transistor 304 and the anode of diode 300 being connected to the first input of gate 294. The gate 294 is a portion of an integrated circuit package IC1 formed of a complementary metal-oxide-silicon (CMOS) circuitry having a protective diode input network including diodes 306 and 308 connected from the first input of the gate 294 to the respective power input terminals $V_{DD}$ and $V_{SS}$ of IC1. The value of the capacitance 296 is selected not to exceed the dissipation capability of the protective network on the input of the gate 294. The output of a NAND gate 310 connected by a resistance 312 to the base of the transistor 304. A first input of the gate 310 is connected to the line 178 from the rate control circuit 174 while the second input of the NAND gate 310 is connected to the line 72 from the control circuit wherein the line 72 is connected to the output of a NAND gate 314 which has a first input connected to the junction between resistances 272 and 274. Second inputs of the NAND gates 292 and 314 are biased high by a suitable connection to the voltage terminal $V_{SS}$. The output of gate 292 is connected to a first input of a NAND gate 315 having its second input joined to terminal $V_{SS}$ and its output joined to line 113.

The output of the variable oscillator 52 on line 46 from the output of gate 292 is connected to first inputs of respective three-input NAND gates 316 and 318 which have second inputs connected to the line 72 and have third inputs connected to the respective lines 170 and 172 from the comparator 168.

In the low frequency oscillator 54 the output of a NAND gate 322 is connected to a first input of a NAND gate 320 while the output of the gate 320 is connected by a series capacitance 324 and resistance 326 to a first input of the gate 322 with the capacitance 324 connected to the output of the gate 320. A resistance 328 connects the output of the gate 322 to the junction of the capacitance 324 and resistance 326. The second input of the gate 320 is biased high by a connection to the voltage terminal $V_{SS}$. The output of the low frequency oscillator 54 from the output of the NAND gate 320 is connected to first inputs of NAND gates 330 and 332 which have second inputs connected to the respective lines 58 and 60 from the other side of the manual up switch 38 and the other side of the manual down switch 40, respectively. The line 56 to the one side of the switches 38 and 40 is connected to the output of a NAND gate 334 which has one input connected to the line 68 and second and third inputs biased high by a connection to the voltage terminal $V_{SS}$.

The outputs of the gates 252 and 254 are connected to first inputs of respective triple-input NAND gates 336 and 338, the outputs of gates 316 and 318 are connected to second inputs of the gates 336 and 338, and the outputs of gates 330 and 332 are connected to third inputs of the gates 336 and 338. The outputs of the NAND gates 336 and 338 join to the signal output lines 74 and 76 from the control logic circuit 42. The line 130 from the power failure sensing circuit is connected to a second input of the gate 256 in the high frequency oscillator 50, a second input of the gate 294 in the variable oscillator 52 and a second input of the gate 322 in the low frequency oscillator 54.

Figure 4:
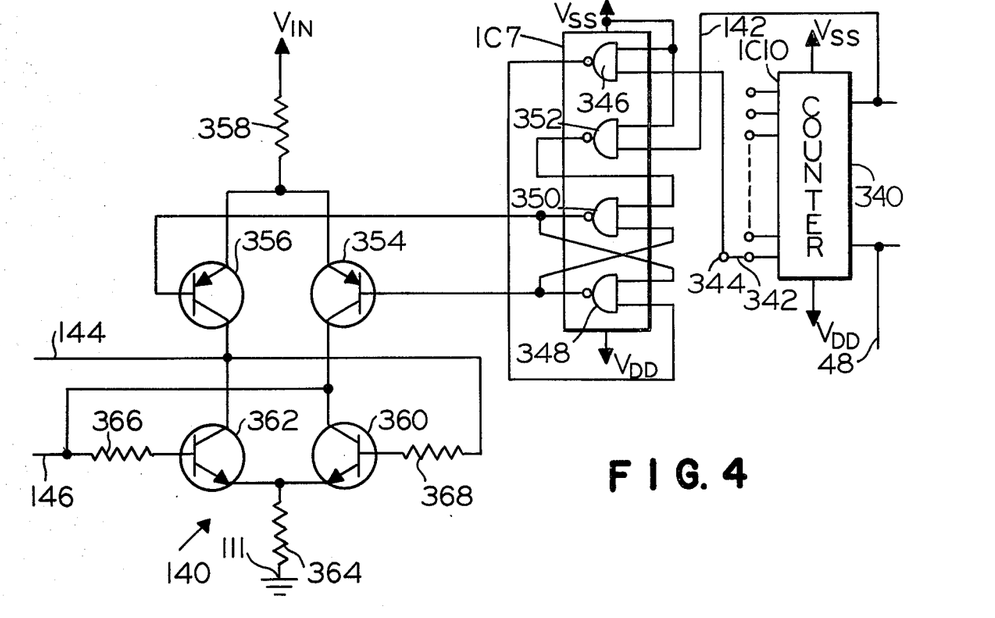
FIG. 4 is a detailed circuit of an update failure circuit in the circuit of FIG. 1.

In the update failure circuit 140, as shown in FIG. 4, the line 48 from the output of the low frequency oscillator is connected to the clock input of a counter 340 while the line 142 from the NAND gate 88 of FIG. 1 is connected to the reset input of the counter 340. The counter 340 is preferably an integrated circuit IC10 such as CD 4020 from RCA Corporation. A selected one of the outputs of the counter 34 is connected by a jumper 342 to a terminal 344 which is connected to one input of a NAND gate 346 having its output connected to a first input of a NAND gate 348 which has its output and second input interconnected with a first input and output, respectively, of a NAND gate 350 in a conventional flip-flop arrangement. The reset line 142 is connected by a NAND gate 352 to the second input of the NAND gate 350 in the flip-flop. The outputs of the flip flop from the NAND gates 348 and 350 are connected to the bases of respective PNP transistors 354 and 356 which have their emitters connected to one end of a resistance 358 connected at its other end to the voltage terminal $V_{IN}$. The collectors of the transistors 354 and 356 are connected to the collectors of respective NPN transistors 360 and 362 which have their emitters connected to one end of a resistance 364 joined at its other end to the ground terminal 111. The junction of the collectors of the transistors 354 and 360 is connected to the output line 146 and by a resistance 366 to the base of the transistor 362. Similarly, the collectors of the transistors 356 and 362 are connected to the output line 144 and by a resistance 368 to the base of the transistor 360.

Figure 5:
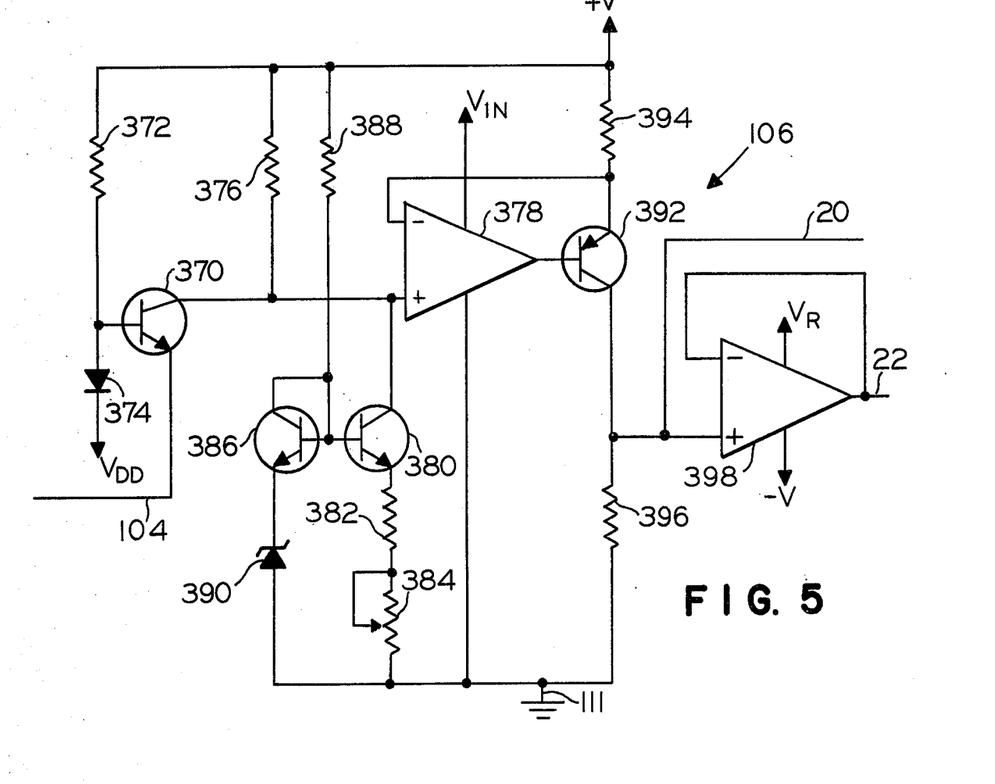
FIG. 5 is a detailed diagram of an output amplifier circuit in FIG. 1.

As illustrated in FIG. 5, the amplifier circuit 106 has a NPN transistor 370 with its emitter connected to the input line 104. A resistance 372 is connected between the voltage terminal +V and the base of the transistor 370. A diode 374 has its connected anode to the base of the transistor 370 and has its cathode connected to the voltage terminal $V_{DD}$. The collector of the transistor 370 is connected by load resistance 376 to the voltage terminal +V and to the non-inverting inputs of an operational integrated circuit amplifier 378. Also connected to the non-inverting input of the amplifier 378 is the collector of an NPN transistor 380 which has its emitter connected by a series resistance 382 and variable resistance 384 to the ground terminal 111. The base of transistor 380 is connected to a junction of the base and collector of an NPN transistor 386 with one end of a resistance 388 which has its other end connected to the voltage terminal +V. The emitter of the transistor 386 is connected to the cathode of a zener diode 390 which has its anode connected to the ground terminal 111. The output of the amplifier 378 is connected to the base of PNP transistor 392 which has its emitter connected by a resistance 394 to the voltage terminal +V and its collector connected by a resistance 396 to the ground terminal 111. A feedback connection is made between the emitter of the transistor 392 and the inverting input of the amplifier 378. The output of the transistor 392 across the resistance 296 is connected to the line 20 and to the non-inverting input of an operational integrated circuit amplifier 398 which has its output connected directly back to its inverting input and to the line 22. The power terminals of the operational amplifier 378 are connected between the voltage terminal $V_{IN}$ and the ground terminal 111 while the power inputs of the operational amplifier 398 are connected between the voltage terminal $V_R$ and the voltage terminal −V.

Figures 6, 8:
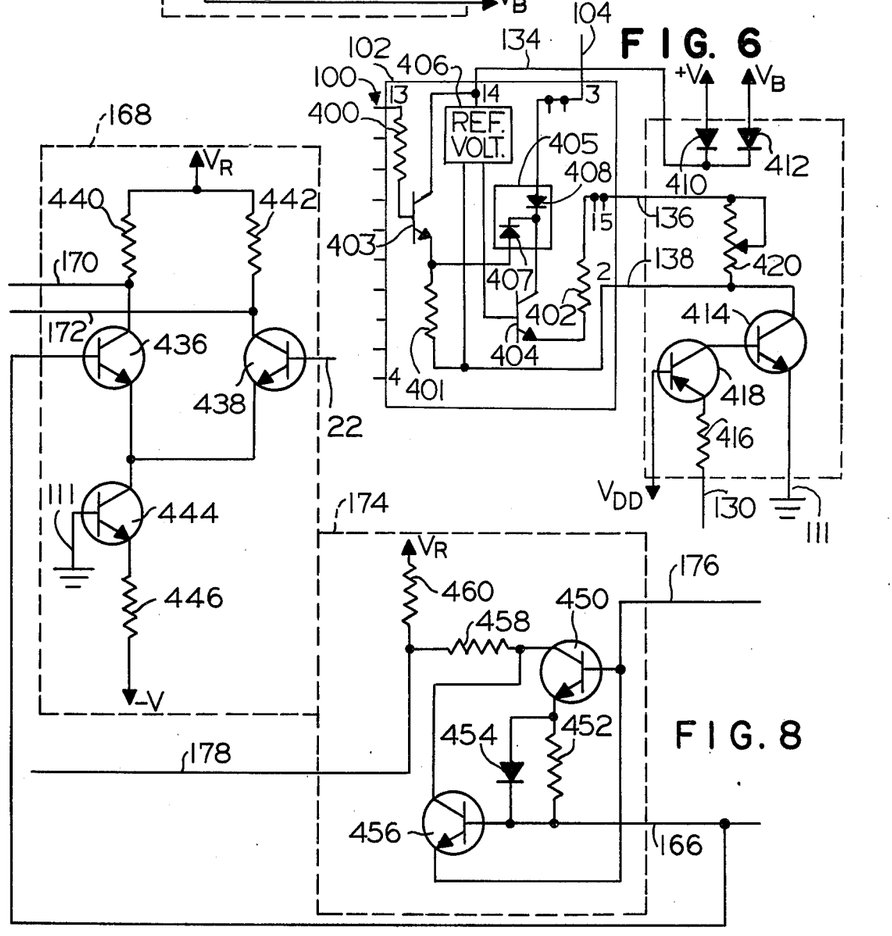
FIG. 6 is a detailed diagram of a power control circuit of FIG. 1.
FIG. 8 is a detailed circuit diagram of a voltage comparing circuit and a rate control circuit in FIG. 1.

A typical integrated circuit digital to analog converter as shown in FIG. 6 may include resistances 400, 401 and 402, transistors 403 and 404 and a current switch 405 for each digital input thereto. Each resistance 400 connects a digital input to the base of the respective transistor 403 which has its collector connected to the positive voltage power input 134. The emitter of each transistor 403 is connected by the respective resistance 401 to the negative voltage power input terminal 138. The output of each input transistor 403 is connected to the respective current switch 405. Each transistor 404 has its emitter connected by the respective resistance 402 to the current amplification input 136; the resistances 402 being weighted or being a portion of a resistance ladder network in correspondence to the digital significance of the respective inputs. The bases of all the transistors 404 are joined to the output of a reference voltage circuit 406 which is energized by the power inputs 134 and 138. All the current switches 405 are joined to the analog signal output. A typical current switch 405 may include a pair of diodes 407 and 408 with their cathodes joined to the collector of transistor 404 and their anodes connected to the emitter of transistor 403 and analog signal output, respectively. One suitable digital-to-analog convertor 102 is model AIM DAC 100 from Precision Monolithics, Inc. wherein pin No. 2 is the negative power input, pin No. 3 is the analog output, pin Nos. 4 through 13 are respective digital inputs, pin No. 14 is the positive power input and pin No. 15 is the current amplification control input.

The positive voltage input line 134 to the digital-to-analog converter 102 is connected to the cathodes of diodes 410 and 412 in the power control circuit 132. The anodes of diodes 410 and 412 are connected to the voltage terminals +V and $V_B$, respectively. The collector emitter of a NPN transistor 414 is connected in series between the negative power line 138 from the digital-to-analog converter 102 and the ground terminal 111. The power failure signal line 130 is connected by a resistance 416 to the emitter of a PNP transistor 418 which has its base connected to the voltage terminal $V_{DD}$ and its collector connected to the base of the transistor 414. A variable resistance 420 is connected in series with the current amplification line 136 and the collector of the transistor 414. The variable resistance 420 is selected to provide for a predetermined current gain on the output line 104 of the analog-to-digital convertor 102.

Figure 7:
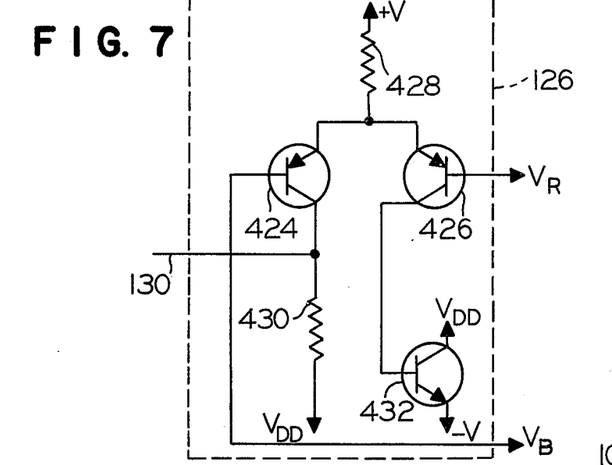
FIG. 7 is a detailed circuit diagram of a power failure sensing circuit in FIG. 1.

In the power sensing circuit 126, as illustrated in FIG. 7, a pair of PNP transistors 424 and 426 have their emitters connected to one end of the resistor 428 which has its other end connected to the voltage terminal +V. The base of the transistor 424 is connected to the voltage terminal $V_B$, while the base of the transistor 426 is connected to the voltage terminal $V_R$. The collector of the transistor 424 is connected by a load resistance 430 to the voltage terminal $V_{DD}$, and the voltage failure output line 130 is connected to the collector of the transistor 424. An NPN transistor 432 has its collector and emitter connected between the voltage terminals $V_{DD}$ and −V while its base is connected to the collector of the transistor 426.

As shown in FIG. 8, the comparator 168 includes a pair of NPN transistors 436 and 438 which have their bases connected to the lines 166 and 22, respectively, and their collectors connected by respective load resistors 440 and 442 to the voltage terminal $V_R$. The emitters of the transistors 436 and 438 are connected to a constant current circuit including an NPN transistor 444 having its base connected to the ground terminal 111 and its emitter connected by a resistance 446 to the voltage terminal $-V$, the collector of the transistor 444 being connected to the emitters of the transistors 436 and 438.

The rate control circuit 174 includes an NPN transistor 450 having its base connected to the input line 176 and its emitter connected by a parallel combination of a resistance 452 and diode 454 to the line 166, the anode of the diode 454 being connected to the emitter of the transistor 450 while the cathode of the diode 454 is connected to the line 166. An NPN transistor 456 has its base connected to the line 166 and its emitter connected to the line 176. The collectors of the transistors 450 and 456 are connected by a pair of serially connected resistances 458 and 460 to the voltage terminal $V_R$. The output line 178 is connected to the junction between the resistors 458 and 460.

Figure 9:
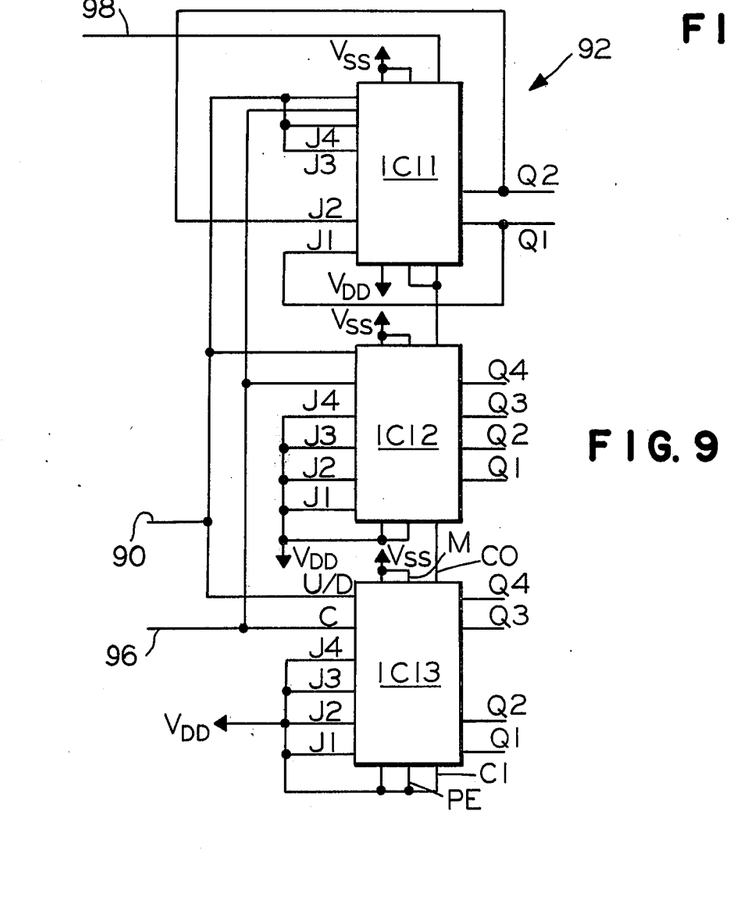
FIG. 9 is a detailed circuit diagram of a memory or counting circuit of the controller circuit in FIG. 1.

As shown in FIG. 9, the memory or counter 92 may comprise a plurality of cascade binary counter circuits such as three cascaded binary intergrated circuits ICII, IC12 and IC13 which, for example, are CD 4029 (RCA Corporation) complementary metal-oxide-silicon circuits which are connected to operate in the binary mode. The jam inputs J1, J2, J3, and J4 and the preset enable inputs PE of IC12 and IC13 are all connected to $V_{DD}$ to allow a straight counting function without any preset. Clock enable or carry-in input CI of IC13 is connected to low voltage terminal $V_{DD}$ and the carry output CO of IC13 is connected to the carry-in input of IC12. The carry-out output of IC12 is connected to the preset enable and carry-in inputs of IC11. The jam inputs J1 and J2 of IC11 are connected to the Q1 and Q2 outputs such that presetting of the first two stages of IC11 are prevented. The jam inputs J3 and J4 of IC11 are connected to the up-down input line 90 to preset the last two stages of the circuit IC11 high when the counter in counting up and to preset the last two stages of the circuit IC11 low when the counter is counting down. The carry output of IC11 is connected to the line 98 and the circuits IC11, IC12 and IC13 are such that the line 98 goes low when the counter reaches its maximum count in the up mode or reaches its minimum count in the down mode.

In addition to the circuits forming the counters 92 and 340, the circuits forming the NAND gates 78, 80, 82, 84, 86, 88, 94, 252, 254, 256, 258, 292, 294, 310, 314, 315, 316, 318, 320, 322, 330, 332, 334, 336, 338, 346, 348, 350 and 352 are complementary metal-oxide-silicon circuits which use very little power. For example, the aforementioned NAND gates which are two input NAND gates are shown as portions of quad NAND gate packages IC1, IC2, IC5, IC7, IC8 and IC9 which may RCA model No. 4011 circuits. The NAND gates which are three input NAND gates are illustrated as portions of three NAND gate packages IC4 and IC6 which may be RCA CD 4023 circuits.

In operation of the controller of FIG. 1, the control logic circuitry 42 in response to digital or binary control signals on lines 24, 26, 28, 30 and 32, in response to operation of manual switches 36, 38 and 40, and in response to analog signals on input 34 generates digital or binary pulses on lines 74 or 76 to change the count in the counter 92 either up or down to change the analog output voltage on lines 20 and 22 up or down. The switch 36 selects either a manual or automatic mode for the controller. When an automatic mode is selected by switch 36, the controller can be automatically operated by digital or binary input signals from lines 24, 26, 28, 30 and 32, and by analog signals on line 34, and when a manual mode is selected, automatic operation is disabled and operation by the manual switches 38 and 40 is enabled.

The control logic 42 may be set so that the output on lines 20 and 22 is incrementally increased one step by each binary pulse on lines 24 and 26 and is incrementally decreased one step by each pulse on lines 28 and 30; or the control logic 42 may be set so that the output on lines 20 and 22 is increased in direct proportion to the width of an input pulse on lines 24 and 26 or is decreased in direct proportion to the width of a pulse on line 28 and 30. In the latter setting of control logic 42 for pulse width operation, output pulses from the high frequency oscillator 50 on line 44 are gated to one or the other of lines 74 and 76 to incrementally step the analog output.

When a signal is present on line 32, the control logic circuitry 42 is controlled by signals on lines 170 and 172 from the comparator 168 to pass pulses from the variable frequency oscillator 52 on line 46 to line 74 or 76. The comparator 168 generates signals on lines 170 and 172 by sensing a difference, and the polarity of the difference, between voltages on lines 22 and 166. The analog control input voltage on line 34 is amplified by the operational amplifier 154 and applied to the line 166. The output voltage on line 22 and the output of the amplifier 154 is also applied across a voltage divider formed by the resistances 172 and 174 to produce a directly proportional voltage applied by lines 166 and 176 to inputs of a rate control circuit 174 which controls the frequency of the variable oscillator 52 in accordance with whether the difference between the analog control signal on line 34 and the output voltage on line 22 is large or small; this allows the variable oscillator to change to a lower frequency when the analog output on line 22 approaches the analog control voltage on input 34 to prevent overshoot due to delays and the like within the controller circuitry.

In the manual mode, operation of the switch 38 or the switch 40 operates the control logic circuitry 42 to apply binary pulses from the low frequency oscillator 54 to the lines 74 or 76, respectively, depending upon whether the analog output on lines 20 and 22 is to be increased or decreased.

When the switch 36 is set in the manual mode, the contacts 150 shunt the indicator 148; and when the switch 36 is set in the automatic mode, the contacts 150 are open to allow operation of the indicator 148. While in the automatic control mode, the update failure circuit 140 senses any absence of input signals on lines 74 and 76 over a selected duration to operate the indicator 148 to indicate that the controller has not been updated for the duration. Particularly, the indicator 148 is set to produce a green light when the controller is in the remote control mode and is changed from green to red when the controller is not updated by pulses on lines 74 and 76 for the selected duration.

The power supply 108 generates the voltages $+V$ and $V_{DD}$ which are positive with respect to the ground input, and generates −V which is negative with respect to the ground input. The voltage from terminal +V is filtered by capacitor 118 and transistor 116 to produce voltage on terminal $V_R$. Diode 120 passes current from terminal $V_R$ to produce voltage on terminal $V_{SS}$. A voltage $V_B$ is produced on the positive terminal of the battery 124 relative to the voltage on the terminal $V_{DD}$. Current through the diode 120 and the resistance 122 maintains the battery 124 in a charged condition so long as the input voltage to the power supply 108 is maintained. The voltage on terminal $V_{SS}$ forms the positive power source for the integrated circuit units IC1, IC2 and IC4 through IC13, and the voltage on terminal $V_{DD}$ forms the negative voltage for the integrated circuits IC1, IC2, and IC4 through IC13.

In event of a power failure or loss of voltage on the input terminals 110 and 111, the voltages on terminals +V, $V_R$, $V_{DD}$, and −V becomes about equal to the ground potential while the battery 124 maintains positive voltages on terminals $V_B$ and $V_{SS}$ with respect to ground. The diode 120 blocks current flow from terminal $V_{SS}$ to the voltage terminals $V_R$ and +V. The battery voltage across the voltage terminals $V_{SS}$ and $V_{DD}$ maintains the integrated circuit units IC1, IC2 and IC4 through IC15 active and particularly maintains the count within the counter 92 at its state when the power fails.

The loss of power is sensed by the power failure sensing circuit 126 which compares the voltage on terminal $V_B$ with the voltage on terminal $V_R$, and in the event that the voltage on $V_R$ drops below the voltage on terminal $V_B$ the power failure circuit 126 generates a signal on line 130 which disables gates 78 and 80 in series with the in lines 74 and 76 preventing pulse signals on lines 74 and 76, which may be subject to spurious signals during power failure, from changing the count in the counter 92. In addition, the power failure signal on line 130 disables the high frequency oscillator 50, the variable oscillator 52 and the low frequency oscillator 54 to lessen drain of power caused by their operation. The power control circuit 132 operated by the power failure signal on line 130 blocks current flow from the outputs of counter 92 through the digital-to-analog convertor 102. Thus very little current drain occurs from battery 124 and the count in counter 92 can be maintained over a very long duration by a relatively small battery 124.

Referring to FIG. 2, the series zener diodes 192 and 194 and the resistance 190, together with the transistors 196 and 198 with the load across the voltage divider of resistances 112 and 114 and voltage regulator transistor 116, FIG. 1, generates the voltages +V and $V_{DD}$. The output from the oscillator 52 on line 113 operates the transistor 206 which in turn drives the complementary push-pull transistors 208 and 214 to generate an AC signal which is passed by capacitor 220 to the rectifier diode 224 to produce a negative voltage across the capacitance 226 and thus terminal −V with respect to the ground terminal 111. The zener diode 222 regulates the negative voltage passed through diode 224.

In the power failure sensing circuit 168 of FIG. 7, the transistors 424 and 426 form a differential amplifier or comparator which is operated by the respective voltages on terminals $V_B$ and $V_R$. So long as the voltage on terminal $V_R$ remains more positive than the voltage on $V_B$, the transistor 424 remains conductive to produce a high output on line 130. If a power failure should drop the voltage on terminal $V_R$ to a lesser voltage on terminal $V_B$, the transistor 426 becomes conductive while the transistor 426 becomes non-conductive thus producing a logical low voltage (i.e. equal to $V_{DD}$) on line 130. Also, conduction of the transistor 426 renders the transistor 432 conductive enabling a quick discharge of various filter capacitances to render the voltages on terminals $V_{DD}$ and −V toward ground voltage.

The contacts 66 of switch 36, FIG. 1, connects the line 68 to logic low or terminal $V_{DD}$ when the switch 36 is in the manual selecting mode and disconnects the line 68 when in the automatic mode. Line 68 when disconnected, is biased high by a small current flow from terminal $V_R$, FIG. 3, through the emitter-gate junction of transistor 270.

The binary or digital pulse inputs on lines 24 and 26, FIG. 3, indicating an up signal, and the input pulse signals on lines 28 and 30 indicating a down signal are coupled through the respective optical isolator circuits in dual optical isolator IC3 to the inputs of gates 252 and 254. When the control logic circuit is set to receive pulse increment or step signals on lines 24, 26, 28 and 30 by the presence of jumper 288, a high bias on line 68 is applied to the second inputs of gates 252 and 254 to pass the pulse increment signals therethrough and hence through summing gates 336 and 338 to the output lines 74 and 76.

When the jumper 284 connects the second inputs of the NAND gates 252 and 254 to the output of the high frequency oscillator or line 44, the control logic circuit 42 is set to advance or decrease the counter 92, FIG. 1, in accordance with the duration of input pulses on line 24, 26, 28 and 30. The high frequency oscillator 50 is enabled by the high signal on the second input of gate 258 to allow the outputs of gates 256 and 258 to go alternately high and low due to charging and discharging of the capacitance 266 to produce pulses which are applied through the jumper 284 to the second inputs of gates 252 and 254. Thus the input signals on lines 24, 26, 28 and 30 operate the gates 252 and 254 to pass pulses from oscillator 50 in accordance with the duration of the input signals.

A logical low signal on line 68 disables the oscillator 50 and when the jumper 288 is present, disables the gates 252 and 254 to prevent signals on lines 24, 26, 28 and 30 generating output pulses on lines 74 and 76. The gate 334 inverts the low signal on line 68 to apply a high signal on line 56 to allow operation of switches 38 and 40, FIG. 1, to enable gates 330 and 332 to pass pulses from oscillator 54 to the summing gates 336 and 338 and hence to output lines 336 and 338.

In the automatic mode, a high input signal on line 32 renders the transistor 276 conductive to apply a low to the first input of gate 314 which inverts the first input and applies a high to line 72. When the transistor 304 of the variable oscillator 42 is rendered conductive by a low signal on line 178 causing gate 310 to place a high voltage on the base of transistor 304, a portion of the discharge current from capacitance 296 flows through transistor 304 and the input protective diode 308 when the output of gate 392 goes from low to high to shorten the cycle time and thus increase the frequency of oscillator 52. Conversely, when the transistor 304 is held non-conductive by high voltages on both lines 72 and 178, the frequency of oscillator 52 is decreased since the positive discharge current passes solely through resistances 298 and 302. The diode 300 shortens the negative portion of the output cycle by passing a portion of negative discharge current from capacitance 296 through protective diode 306 when the output of gate 292 goes from high to low; this enables the transistor 304 to cause a greater change in frequency than if the negative discharge current was made to pass solely through resistance 298 and 302. The gates 316 and 318 are enabled by the high signal on line 72 to be operated by a high signal on either of the respective lines 170 and 172 to pass the output pulses from the oscillator 52 to the summing gates 336 and 338 and hence to the output lines 74 and 76. The output pulses on line 46 are inverted by gate 315 and applied to line 113.

When the line 68 is held low for the manual mode, the transistor 270 is rendered into conductive saturation to shunt resistance 272 and thus hold the first input of gate 314 high to produce a low on line 72 which prevents the gates 316 and 318 from being operated by signals on lines 170 and 172. In the automatic mode, a low signal on line 32 causes transistor 276 to be non-conductive which also holds the first input of gate 314 high and disables gates 316 and 318.

A low signal on line 130 from the power failure sensing circuit 126, FIGS. 1 and 7, disables gates 256, 294 and 322 in the respective oscillators 50, 52 and 54 to prevent their operation and thus conserve standby battery power.

In the counter or memory 92, FIG. 9, an up mode level on the line 90 is generated by the bistable circuit of the gates 82 and 94, which are switched to an up mode by the gate 78, so that clock signals on line 96 cause the cascaded integrated circuits IC13, IC12, IC11 to count upwards. If the counters IC11, IC12 and IC13 reach their full binary count on the ten output lines the output of the counter on line 98 produces a low signal provided the line 90 is at an up mode level. When a down mode level is created on the line 90 by the bistable circuit of gates 82 and 84 being switched by the gate 80, the clock signals received on the line 96 will cause the integrated circuit counters IC11, IC12, and IC13 to count down. If zero count is reached, the output of the counter 92 on the line 98 produces an low output signal. Referring to FIG. 1, the output signal on line 98 disables the gate 86 to prevent the clock signals from being produced by the gate 86 and thus prevent the counter 92 from flipping from the full count to the zero count or from the zero count to the full count.

The pulses from the low frequency oscillator in line 48 advance the counter 340 in the update failure sensing circuit of FIG. 4. Normally, signals are generated from the gate 88, FIG. 1, with each update from the remote control digital inputs 24, 26, 28 and 30 or resulting from an update due to a change in the analog input on line 34 to produce an output signal on line 142 which resets the counter 340 to the zero state. Thereafter, a new counting period begins. In the event that the counter is not reset prior to reaching the selected count at which the jumper 342 is energized, the flip flop formed by the gates 348 and 350 is operated to drive the complementary differential amplifier formed by the transistors 354, 356, 360, and 362 to an opposite conducting condition to change the voltage conditions on lines 144 and 146. A change in voltage condition on lines 144 and 146 switches the indicator 148, FIG. 1, from the green light condition to the red light condition or vice versa.

Referring to FIG. 6, the binary outputs of the counter on lines 100 are converted into a corresponding analog current signal on line 104. Currents through transistors 404 have a value to generate a voltage across resistances 402 and the resistance 420 corresponding to the reference voltage. Since each of the resistances 402 is weighted or has a value selected in accordance with the significance of the corresponding input, the currents applied from the transistors 404 to the respective current switches 405 are also correspondingly weighted. When any input is high, the current through the respective switch 405 is shunted through diode 407 and the transistor 403, and when any input is low, the current through the respective switch passes through the diode 408 to the output line 104.

Upon a power failure, the positive high voltage is maintained on the positive power input connected to line 134 by diode 412 becoming conductive and diode 410 becoming non-conductive to block current therethrough. The line 130 going low renders transistors 418 and 414 non-conductive which opens the connection of the negative power terminal and the current amplification control terminal of the converter 102 to ground. Opening this connection to ground prevents current drain from the battery through line 134 as well as allowing the internal circuit of the converter 102, including the emitters and collectors of all transistor 403 connected to the inputs, to go high. Biasing the emitters and collectors of transistors 403 high renders the base-emitter and base-collector junctions of the transistors 403 non-conductive preventing any significant current flow through the lines 100. In normal use, the inputs to the converter 102 will draw significant current which, although small, would limit the time that the battery 124, FIG. 1, could maintain the count in the counter.

In FIG. 5, the current on line 104 is converted by the transistor 370 in series with the resistance 376 to a voltage across the resistance 376 which is applied to the non-inverting input of the operational amplifier 378. Additionally, bias is applied to the non-inverting input of the operational amplifier 378 by a constant current drawn by the transistor 380 through the resistance 376. The current drawn through the transistor 380 is determined by the value of the resistor 384 as well as the value of the zener diode 390 and the base-emitter voltage drop of the transistor 386. The operational amplifier 378 then drives the transistor 392 in accordance with the current through the line 104 to produce an output voltage on line 20 which is applied to the non-inverting input of the operational amplifier 398 to produce a buffered output in a conventional manner on the line 22.

In the voltage comparator 168, as shown in FIG. 8, the buffered analog output on line 22 is applied to the base of the transistor 438 while the output of the amplifier 154 from the analog control input line 34 is applied over line 166 to the base of the transistor 436. The transistor 444 produces a constant current flow through the transistors 436 and 438 causing the lines 170 and 172 to be high or low in accordance with whether the input on line 22 is higher than the input on line 166 or vice versa. When the voltages on lines 22 and 166 are equal, the output on both lines 170 and 172 is low.

When the voltage on line 176 is positive with respect to the voltage on line 166 by at least the voltage necessary to render the transistor 450 in the rate control circuit 174 saturated, the output on line 178 is low. Similarly, when the voltage on line 166 is more positive than the voltage on line 176 by at least the voltage necessary to render the transistor 456 fully conductive, the output on line 178 is low. When the voltage on the lines 166 and 176 is sufficiently close to each other that neither one of the transistors 450 and 456 are rendered conductive, the output voltage on line 178 is high.

Since many modifications, changes in detail, and variations can be made in the presently described controller, it is intended that all matter in the foregoing description and the acccompanying drawings be interpreted as illustrative and not in a limiting sense.

What is claimed is:

1. A controller circuit comprising a memory having an input and a plurality of outputs for generating digital signals;

digital-to-analog converting means responsive to the digital signals from the memory for converting the digital signals to an analog signal;

first digital input means responsive to digital input signals for incrementally changing the digital signals in the memory;

second digital input means responsive to digital input signals and including a first oscillator for changing the digital signals in the memory in proportion to the length of the digital input signal;

analog input means including a second oscillator generating a digital signal for changing the digital signals in the memory;

data gating means for selectively connecting one of the first digital input means, the second digital input means and the analog input means to the memory;

main power supply means for the memory, the digital-to-analog converting means, the data gating means, and the input means;

standby power means;

means responsive to failure of the main power means and energized by the standby power means for maintaining power to the memory means and the data gating means;

means operated by the power maintaining means for blocking current flow from the plurality of outputs of the memory; and means operated by the power maintaining means for disabling input to the memory during failure of the main power supply means by inhibiting the operation of the data gating means, the input disabling means also disabling the first and second oscillators to minimize power drain on the standby power means.

2. A controller circuit as claimed in claim 1 wherein the blocking means includes switch means connected in a line to the digital-to-analog converter in response to operation of the power maintaining means.

3. A controller circuit as claimed in claim 1 further comprising manually controlled input means including a low frequency oscillator which generates a digitial signal which is manually gated to send digital signals to change the digital signals in the memory, the low frequency oscillator being input disabled by the disabling means during failure of the main power means.

4. A controller as claimed in claim 1 wherein the standby power means is a rechargable battery and the power maintaining means includes a resistor connecting the main power means to the battery so that the battery is constantly recharged when the main power means is operative.

5. A controller circuit comprising a memory including a binary counter having an input, a plurality of first outputs for generating binary output signals, and a second output for producing a signal when the counter is full and when the counter is empty;

digital to analog converting means having a plurality of binary inputs connected to the respective first outputs of the memory, a plurality of input junction transistors having control electrodes connected to the respective binary inputs of the converting means, a plurality of current generators for producing currents having values corresponding to the significance of the binary inputs of the converting means, a signal output, a plurality of current switching means operated by the input transistors for switching current from the respective current sources to the signal output, and a pair of power input terminals for energizing the converting means;

amplifier means connected to the signal output for generating an analog output signal;

first input means responsive to binary input signals and including first gating means having first inputs for receiving the binary input signals, a high frequency oscillator, bias means, a selective connection means for making first and second alternate connections, said first connection being to connect the high frequency oscillator to second inputs of the first gating means whereby the binary input signals gate the pulses from the high frequency oscillator, and said second connection being to connect the bias means to the second inputs of the first gating means whereby the binary input signals pass through the gating means;

second input means responsive to an analog input signal and including a variable oscillator, second gating means having first inputs connected to the variable oscillator, a comparator for sensing a difference between the analog output signal and the analog input signal for selectively operating the second gating means, and means responsive to a difference between the analog input signal and the analog output signal exceeding a predetermined value for operating the variable oscillator at a first rate and, when the difference does not exceed the predetermined value, for operating the variable oscillator at a second rate;

indicating means having an off condition, and first and second on conditions;

means sensing the absence of signals from the first and second gating means for a predetermined duration for changing the indicating means from the first on condition to the second on condition to indicate a failure of the controller to update the analog output signal;

manual control means including a low frequency oscillator, third gating means having first inputs connected to the low frequency oscillator, and switch means selectively controlling second inputs of the third gating means;

summing means responsive to the outputs of the first, second and third gating means;

fourth gating means having inputs from the summing means and an output to the input of the memory;

mode control switch means having an automatic mode position disabling the third gating means and having a manual mode position for disabling the first and second gating means;

said mode control switch means further having means for placing the indicating means in the of condition when the mode control switch is in the manual mode position;

power supply means adapted to be energized by an external power source for generating a main power voltage;

a chargeable standby battery;

means connected to power supply means for energizing a first portion of the controller circuit;

diode means connecting the remaining portion of the controller circuit, including the memory and the fourth gating means, to the power supply means for energizing the remaining portion of the controller circuit;

a resistance connecting the standby battery to the diode means such that the battery is charged by the power supply means and the battery maintains energization on the remaining portion of the controller circuit in the event that there is a loss of external power;

said remaining portion of the controller circuit consisting of complementary metal-oxide-silicon circuitry;

power failure sensing means for sensing the voltage on the battery exceeding the main power voltage;

said fourth gating means having inputs connected to the power failure sensing means and connected to the second output of the memory for disabling the fourth gating means to prevent input signals to the memory in the event of power failure, the counter being full, or the counter being empty;

power control means responsive to the power failure sensing means for disconnecting one of the pair of power input terminals of the converting means and for biasing the other of the pair of power input terminals of the converting means to backbias the junctions of the input transistors.

* * * * *